(12) United States Patent
Badger, II et al.

(10) Patent No.: US 11,654,795 B2
(45) Date of Patent: May 23, 2023

(54) VEHICLE AND METHOD OF PRECONDITIONING CABIN AIR WITHIN A VEHICLE

(71) Applicant: FORD GLOBAL TECHNOLOGIES, LLC, Dearborn, MI (US)

(72) Inventors: Charles Everett Badger, II, Westland, MI (US); Rohan Shrivastava, Livonia, MI (US); Jordan Mazaira, Taylor, MI (US); Zachary March, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 17/098,704

(22) Filed: Nov. 16, 2020

(65) Prior Publication Data

US 2022/0153170 A1 May 19, 2022

(51) Int. Cl.
*B60L 58/27* (2019.01)
*B60L 1/04* (2006.01)
*B60L 58/12* (2019.01)

(52) U.S. Cl.
CPC ............... *B60L 58/27* (2019.02); *B60L 1/04* (2013.01); *B60L 58/12* (2019.02); *B60L 2240/54* (2013.01)

(58) Field of Classification Search
CPC .. B60L 58/27; B60L 58/12; B60L 1/04; B60L 2240/54; Y02T 10/70
See application file for complete search history.

(56) References Cited

U.S. PATENT DOCUMENTS

| | | | |
|---|---|---|---|
| 2018/0334170 A1 | 11/2018 | Liu et al. | |
| 2019/0248241 A1 | 8/2019 | Badger, II et al. | |
| 2019/0283531 A1 | 9/2019 | Spryshak | |
| 2020/0238850 A1* | 7/2020 | Kusada | G08G 1/205 |

* cited by examiner

*Primary Examiner* — Tyler J Lee
*Assistant Examiner* — Yufeng Zhang
(74) *Attorney, Agent, or Firm* — David B Kelley; Brooks Kushman P.C.

(57) ABSTRACT

A vehicle includes a temperature control system, a battery configured to power the temperature control system, and a controller. The controller is programmed to, in response to a request to precondition the battery or the cabin air, an absence of receiving a signal indicative of a desired initial battery state of charge, and an actual battery state of charge being greater than a default threshold, deliver electrical power from the battery to the temperature control system at a desired value. The controller is further programmed to, in response to the request to precondition the battery or the cabin air, receiving the signal indicative of the desired initial battery state of charge, and the actual battery state of charge being greater than the desired initial battery state of charge but less than the default threshold, deliver electrical power from the battery to the temperature control system at the desired value.

20 Claims, 3 Drawing Sheets

VEHICLE AND METHOD OF PRECONDITIONING CABIN AIR WITHIN A VEHICLE

TECHNICAL FIELD

The present disclosure relates to vehicles and control systems to condition a battery or cabin air within a vehicle.

BACKGROUND

Vehicles may include temperature control systems for batteries and climate control systems that are configured to control the temperature of the air within the vehicle cabin.

SUMMARY

A vehicle includes a temperature control system, a battery configured to power the temperature control system, a human machine interface, and a controller. The human machine interface is configured to receive a request to precondition the cabin air or a temperature of the battery prior to initiating a drive cycle and to receive a desired initial battery state of charge prior to initiating the drive cycle. The controller is programmed to, in response to the request to precondition the cabin air or the temperature of the battery, an absence of receiving the desired initial battery state of charge, and an actual battery state of charge being greater than or equal to a default threshold, deliver electrical power from the battery to the temperature control system at a desired value to precondition the cabin air or the temperature of the battery. The controller is further programmed to, in response to the request to precondition the cabin air or the temperature of the battery, the absence of receiving the desired initial battery state of charge, and the actual battery state of charge being less than the default threshold, deliver electrical power from the battery to the temperature control system at less than the desired value to precondition the cabin air or the temperature of the battery. The controller is further programmed to, in response to the request to precondition the cabin air or the temperature of the battery, receiving the desired initial battery state of charge, and the actual battery state of charge being greater than or equal to the desired initial battery state of charge but less than the default threshold, deliver electrical power from the battery to the temperature control system at the desired value to precondition the cabin air or the temperature of the battery. The controller is further programmed to, in response to the request to precondition the cabin air or the temperature of the battery, receiving the desired initial battery state of charge, and the actual battery state of charge being less than the desired initial battery state of charge, deliver electrical power from the battery to the temperature control system at less than the desired value to precondition the cabin air or the temperature of the battery.

A vehicle includes a temperature control system, an electric machine configured to propel the vehicle, a battery configured to power the electric machine and the temperature control system, and a controller. The controller is programmed to, in response to a request to precondition the cabin air prior to initiating a drive cycle, an absence of receiving a signal indicative of a desired initial battery state of charge, and an actual battery state of charge being greater than a default threshold, deliver electrical power from the battery to the temperature control system at a desired value to precondition the cabin air. The controller is further programmed to, in response to the request to precondition the cabin air prior to initiating the drive cycle, the absence of receiving the signal indicative of the desired initial battery state of charge, and the actual battery state of charge being less than the default threshold, deliver electrical power from the battery to the temperature control system at less than the desired value to precondition the cabin air. The controller is further programmed to, in response to the request to precondition the cabin air prior to initiating the drive cycle, receiving the signal indicative of the desired initial battery state of charge, and the actual battery state of charge being greater than the desired initial battery state of charge but less than the default threshold, deliver electrical power from the battery to the temperature control system at the desired value to precondition the cabin air. The controller is further programmed to, in response to the request to precondition the cabin air prior to initiating the drive cycle, receiving the signal indicative the desired initial battery state of charge, and the actual battery state of charge being less than the desired initial battery state of charge, deliver electrical power from the battery to the temperature control system at less than the desired value to precondition the cabin air.

A vehicle includes a temperature control system, an electric machine configured to propel the vehicle, a battery configured to power the electric machine and the temperature control system, and a controller. The controller is programmed to, in response to a request to precondition the temperature of the battery prior to initiating a drive cycle, an absence of receiving a signal indicative of a desired initial battery state of charge, and an actual battery state of charge being greater than a default threshold, deliver electrical power from the battery to the temperature control system at a desired value to precondition the temperature of the battery. The controller is further programmed to, in response to the request to precondition the temperature of the battery prior to initiating the drive cycle, receiving the signal indicative of the desired initial battery state of charge, and the actual battery state of charge being greater than the desired initial battery state of charge but less than the default threshold, deliver electrical power from the battery to the temperature control system at the desired value to precondition the temperature of the battery.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
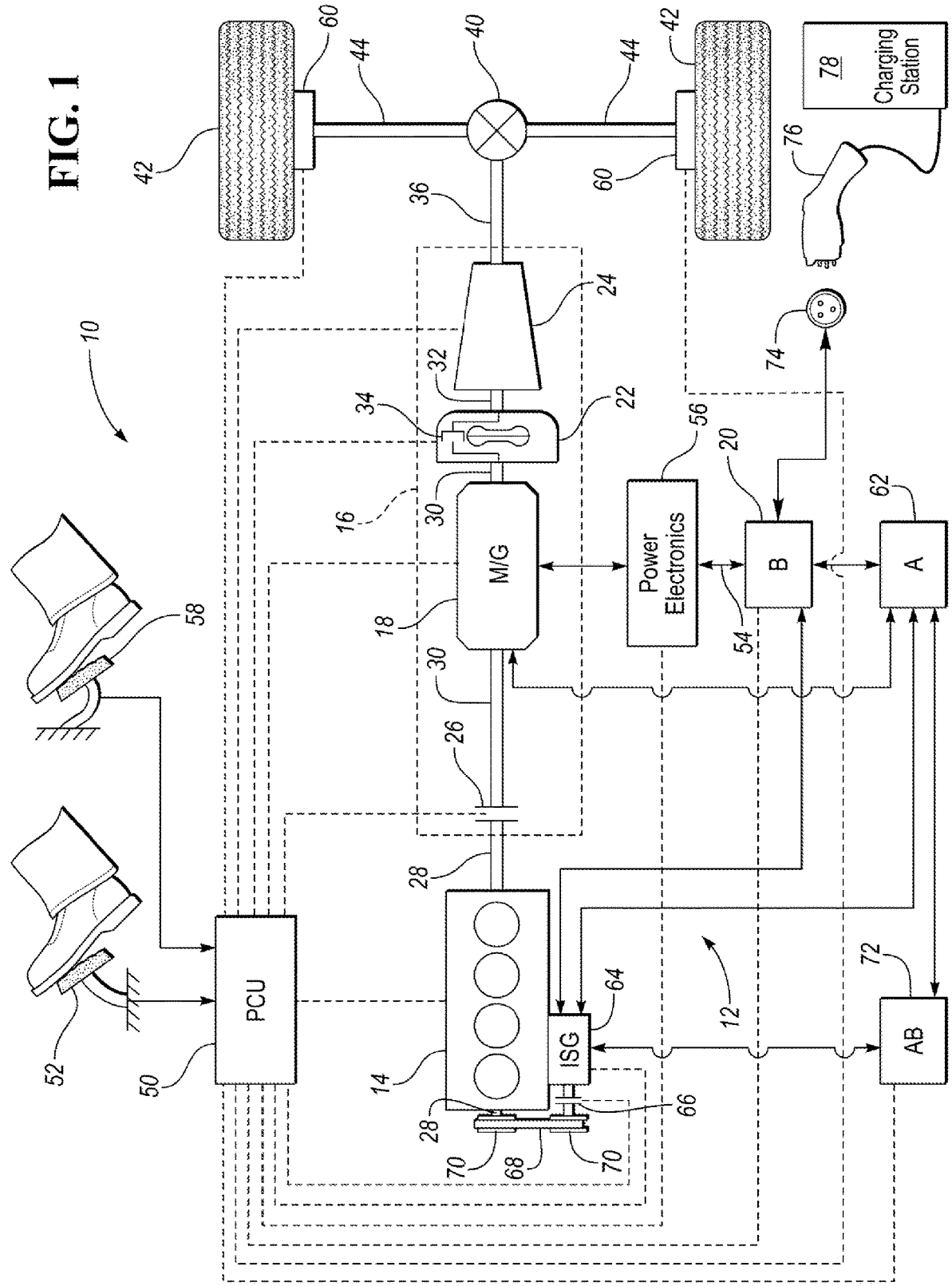
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and/or the M/G 18 may also be configured to provide electrical power to one or more vehicle accessories 62. The vehicle accessories 62 may include, but are not limited to, climate control systems, power steering systems, radios, control interfaces (e.g., HMI 96), various controllers, entertainment systems (e.g., monitors, DVD players, etc.), electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The vehicle 10 may include an electrical outlet 74 that is configured receive a plug 76 from a charging station 78 in order to establish an electrical connection between the battery 20 and the charging station 78. Once the electrical connection has been established, the charging station 78 is configured to recharge the battery 20.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should further be understood that the vehicle configuration described herein is merely exemplary and is not intended to be limited. Other electric or hybrid vehicle configurations should be construed as disclosed herein. Other electric or hybrid vehicle configurations may include, but are not limited to series hybrid vehicles, parallel hybrid vehicles, series-parallel hybrid vehicles, plug-in hybrid electric vehicles (PHEVs), fuel cell hybrid vehicles, battery electric vehicles (BEVs) or any other electric or hybrid vehicle configuration known to a person of ordinary skill in the art.

Figure 2:
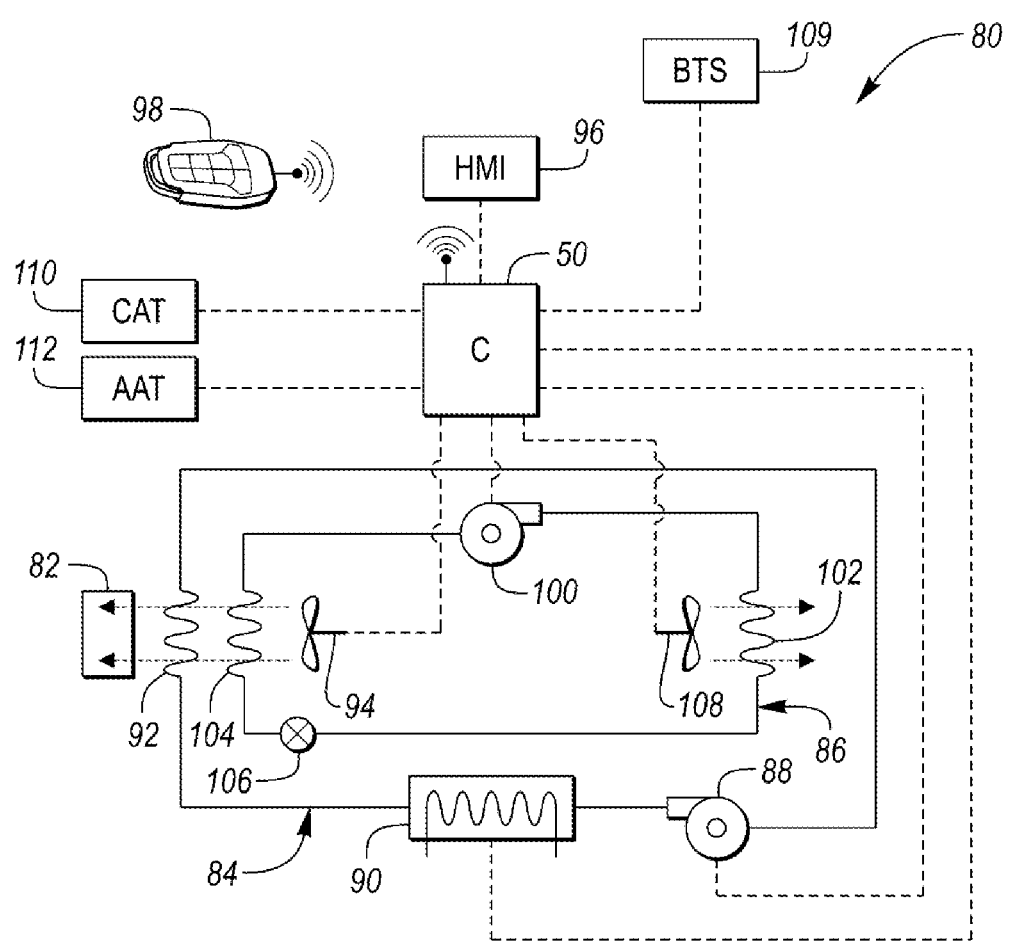
FIG. 2 is a schematic illustration of a temperature or climate control system of the vehicle.

Referring to FIG. 2, a climate control system 80 of the vehicle 10 is illustrated. The climate control system 80 may also be referred to as a temperature control system. The climate control system 80 is configured to condition air that is being introduced into the cabin 82 of the vehicle 10 or to adjust the temperature of the battery 20. Additionally, or in the alternative, the climate control system 80 may be configured to heat or cool the battery 20. The climate control system 80 includes a coolant circuit 84 that is configured increase the temperature of the air that is within the cabin 82, the air that is being introduced into the cabin 82, and/or air that is being utilized to heat the battery 20. The climate control system 80 also includes a refrigerant circuit 86 that is configured to decrease the temperature of and dry the air that is within or is being introduced into the cabin 82, and/or to cool the battery 20. Alternatively, the coolant circuit 84 may directly heat the battery 20 via a first heat exchanger (e.g., electric heater 90 or heat exchanger 92 described below) and/or the coolant circuit may directly cool the battery via a second heat exchanger (e.g., evaporator 104 described below or a chiller plate).

The coolant circuit 84 includes a pump 88 that is configured to circulate coolant through the coolant circuit 84, an electric heater 90 (such as a positive temperature coefficient or PTC heater) that is configured to heat the coolant within the coolant circuit 84, and a heat exchanger 92 (e.g., a heater core). A fan 94 is configured to direct air across the heat exchanger 92 in order to heat air that is being directed to the battery 20 and/or into the cabin 82 of the vehicle 10. The controller 50 may be configured to operate the pump 88, the electric heater 90, and/or the fan 94 in order to provide heating to the battery 20 or cabin 82 in response to a request from a vehicle operator or a request from the controller 50 to increase the temperature of the battery 20 or the air temperature in the cabin 82.

The vehicle operator may request battery or cabin heating by communicating with the controller 50 via a human machine interface (HMI) 96. Alternatively, the vehicle operator may request battery or cabin heating by communicating with the controller 50 via a wireless device 98, such as a key fob. The M/G 18, the battery 20, the ISG 64, and the accessory battery 72 may all be configured to provide electrical power to operate the climate control system 80 (e.g., the pump 88, the electric heater 90, and the fan 94) in order to heat the battery 20 or cabin air through various electrical connections (not shown). The engine 14 may power the M/G 18 or the ISG 64 in order to generate the electrical power to operate the climate control system 80 when heating the battery 20 or cabin air.

The coolant circuit 84 may also be configured to direct coolant through passages (not shown) within the engine 14 in order to remove excess heat from the engine 14 that is generated by combustion. The coolant circuit 84 may also include a second heat exchanger (not shown), such as a radiator, that is configured to reject excess heat from the coolant within the coolant circuit 84 to the ambient surroundings (e.g., the ambient air). A second fan (not shown) may be configured to direct air across the second heat exchanger in order reject excess heat from the coolant within the coolant circuit 84 to the ambient surroundings.

The refrigerant circuit 86 includes a refrigerant compressor 100, a condenser 102, an evaporator 104, and a thermal expansion valve 106. The fan 94 may be configured to direct air across the evaporator 104 in order to cool the battery 20 and/or to cool and dry the air that is being directed into the cabin 82. A secondary fan 108 may be configured to direct air across the condenser 100 in order to reject heat from the refrigerant circuit 86 to the ambient surroundings (e.g., the ambient air). The controller 50 may be configured to operate the refrigerant compressor 100, the fan 94, and/or the secondary fan 108 in order to provide cooling to the battery 20 or cabin 82 in response to a request from a vehicle operator to decrease the air temperature the cabin 82.

The controller 50 may request battery or cabin cooling, or the vehicle operator may request battery or cabin cooling by communicating with the controller 50 via a human machine interface (HMI) 96. Alternatively, the vehicle operator may request battery 20 or cabin cooling by communicating 50 with the controller via the wireless device 98. The M/G 18, the battery 20, the ISG 64, and the accessory battery 72 may all be configured to provide electrical power to operate the climate control system 80 (e.g., the compressor 100, the fan 94, and the secondary fan 108) in order to cool the battery 20 or the cabin air through various electrical connections (not shown). The engine 14 may power the M/G 18 or the ISG 64 in order to generate the electrical power operate the climate control system 80 when cooling the battery 20 or the cabin air.

The request to heat or cool the battery 20 or cabin air may be a generic request to condition the battery 20 or cabin air to a target or desired temperature. The controller 50 may then determine to operate either the coolant circuit 84 to heat the battery 20 or the cabin air or the refrigerant circuit 86 to cool the battery 20 or the cabin air. The coolant circuit 84 may be operated to heat the battery 20 or cabin 82 if an initial or current temperature of the battery 20 or the cabin air is less than a desired temperature. The refrigerant circuit 86 may be operated to cool the battery 20 or the cabin 82 if a current temperature of the battery 20 or cabin air is greater than a target temperature. A battery temperature sensor 109 or cabin air temperature sensor 110 may be configured to detect and communicate the current temperature of the battery 20 or the air within the cabin 82, respectively, to the controller 50. An ambient air temperature sensor 112 may be configured to detect and communicate the current temperature of the ambient air surrounding the vehicle 10 to the controller 50.

The request to condition the battery 20 or cabin air may be a request to precondition the battery 20 or cabin air prior to the vehicle operator entering the vehicle and turning on an ignition of the vehicle 10. As previously stated, the request may be made by the controller 50, via the HMI 96, or the wireless device 98. The vehicle operator or user may also program the controller 50 (via the HMI 96 or wireless device 98) such that the request to precondition the battery 20 or the cabin air to a target air temperature is preset to occur on a specific date, on a specific day of the week, and/or at a specific time of day.

Figure 3:
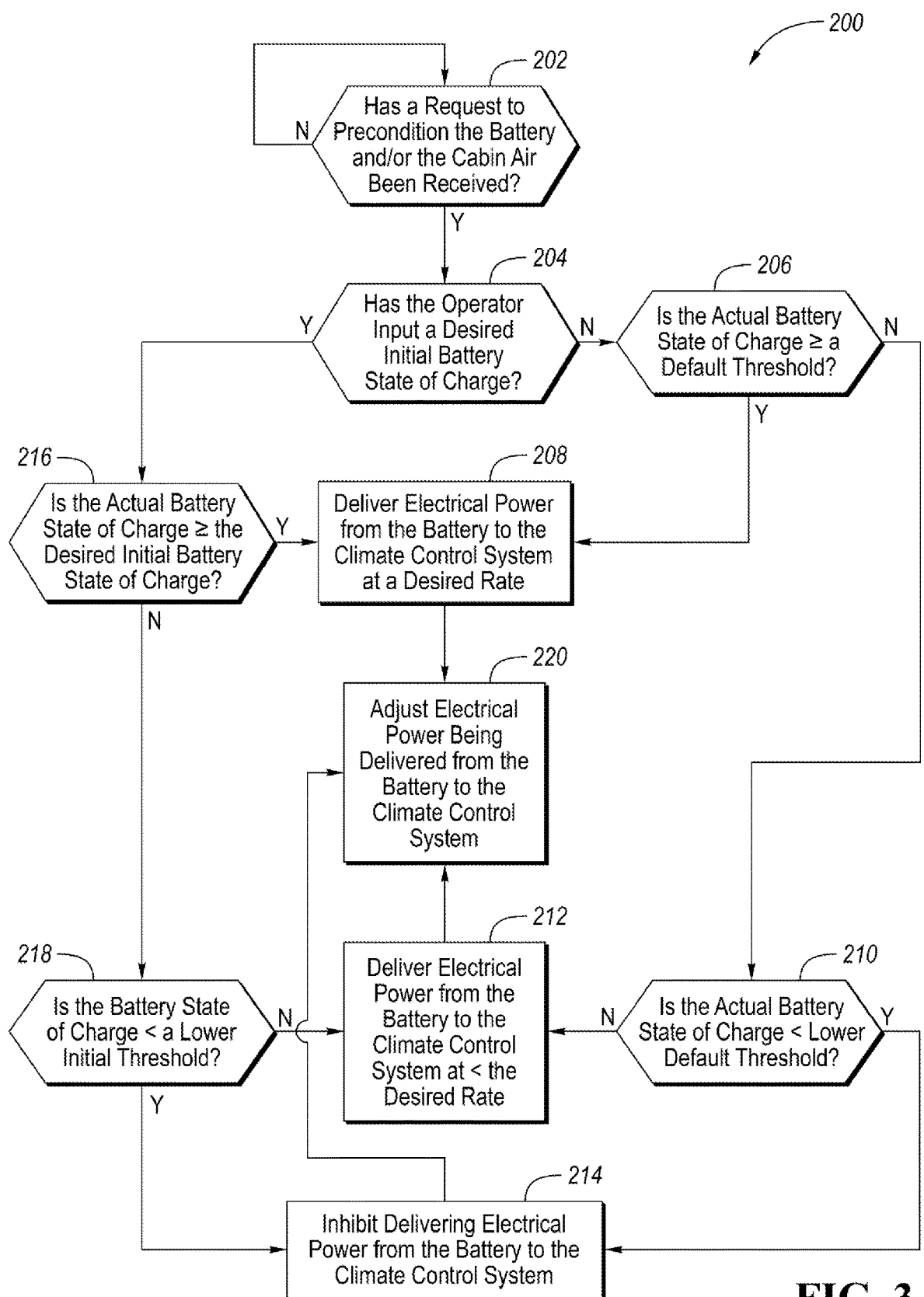
FIG. 3 is a flowchart illustrating a method of preconditioning cabin air.

Referring to FIG. 3, a method 200 of preconditioning the battery 20 temperature or the air being introduced into the cabin 82 is illustrated. The method 200 may be stored as control logic and/or an algorithm within the controller 50. The controller 50 may implement the method 200 by controlling the various components of the vehicle 10, including the subcomponents of the climate control system 80 depicted in FIG. 2. The method 200 is initiated at block 202, where it is determined if a request to precondition the battery 20 and/or the cabin air to a target temperature has been received (i.e., if the controller has received a signal from the HMI 96 or the wireless device 98) prior to initiating the drive cycle (i.e., prior to the vehicle being turned on or prior to the ignition of the vehicle being engaged). If there is not a request to precondition the battery 20 and/or the cabin air to a target temperature, the method 200 recycles back to the beginning of block 202. If there is a request to precondition the battery 20 and/or the cabin air to a target temperature, the method 200 moves on to block 204. It should be noted that the target temperatures for the battery 20 and the cabin air may have the same or different values if the method 200 is being operated to condition both the battery 20 and the cabin air.

At block 204 it is determined if the vehicle operator has input a desired initial battery state of charge (e.g., a minimum state of charge that is desired by the operator upon initiating a drive cycle). The desired initial battery state of charge may be input into the controller 50 via the HMI 96 or wireless device 98. The battery may be the traction battery 20 or the accessory battery 72. If the vehicle operator has not input a desired initial battery state of charge, the method 200 moves on to block 206, where it is determined if an actual state of charge of the battery is greater than or equal to a default threshold. The default threshold may refer to a 100% state of charge of the battery. However, the default threshold may have values that are less than a 100% state of charge of the battery.

If it is determined at block 206 that the actual state of charge of the battery is greater than or equal to the default threshold, the method 200 moves on to block 208, where the battery is controlled to deliver electrical power at a desired rate to the climate control system 80 to condition the battery 20 and/or the cabin air. More specifically, at block 208 the battery may deliver the power required to meet any electrical demand of the climate control 80 system including any electrical demand of the pump 88, the electric heater 90, the compressor 100, the fan 94, and/or the secondary fan 108 to condition the battery 20 and/or the cabin air.

Also, at block 208, the battery may be controlled to deliver electrical power at the desired rate to the climate control system 80 based on maintaining the actual battery state of charge at a value that is greater than or equal to the default threshold, which is based on a current battery charging value (e.g., the rate at which the charging station 78 is charging the battery) and a current battery discharging value (e.g., the rate at which one or more components of the vehicle, such as the climate control system 80 or other vehicle accessories 62, are discharging the battery). For example, if the difference between the current battery discharging value and the current battery charging value is not sufficient to decrease the battery state of charge to less than the default threshold, the battery will continue to deliver electrical power at the desired rate to the climate control system 80 to condition the battery 20 and/or the cabin air.

If it is determined at block 206 that the actual state of charge of the battery is not greater than or equal to (i.e., is less than) the default threshold, the method 200 moves on to block 210, where it is determined if the actual state of charge of the battery is less than a lower default threshold. The lower default threshold has a value that is less than the default threshold defined in block 206. Furthermore, the default threshold and the lower default threshold may define a range of values. If the actual state of charge of the battery is not less than (i.e., is greater than or equal to) a lower default threshold and is within the range of values between the default threshold and the lower default threshold, the method 200 moves onto block 212, where the battery is controlled to deliver electrical power at less than the desired rate to the climate control system 80 to condition the battery 20 and/or the cabin air. More specifically, at block 212 the battery may deliver power to the climate control system 80 at a rate that is less than the power required to meet the electrical demand of the climate control system 80 including the power demands of the pump 88, the electric heater 90, the compressor 100, the fan 94, and/or the secondary fan 108 to condition the battery 20 and/or the cabin air.

Also, at block 212, the battery may be controlled to deliver electrical power at less than the desired rate to the climate control system 80 based on the actual battery state of charge decreasing to less than the default threshold, which is based on the current battery charging value (e.g., the rate at which the charging station 78 is charging the battery) and the current battery discharging value (e.g., the rate at which one or more components of the vehicle, such as the climate control system 80 or other vehicle accessories 62, are discharging the battery). For example, if the difference between the current battery discharging value and the current battery charging value is sufficient to decrease the battery state of charge to less than the default threshold, the battery will deliver electrical power at less than the desired rate to the climate control system 80 to condition the battery 20 and/or the cabin air.

If the actual state of charge of the battery is less than a lower default threshold at block 210, the method 200 moves onto block 214, where the battery is inhibited (i.e., prevented) from delivering electrical power to the climate control system 80 including the pump 88, the electric heater 90, the compressor 100, the fan 94, and/or the secondary fan 108 to condition the battery 20 and/or the cabin air.

Returning to block 204, if the vehicle operator has input a desired initial battery state of charge, the method 200 moves on to block 216, where it is determined if an actual state of charge of the battery is greater than or equal to a desired initial battery state of charge. The desired initial battery state of charge may be less than the default threshold, particularly if the default threshold is a 100% charge.

If it is determined at block 216 that the actual state of charge of the battery is greater than or equal to the desired initial battery state of charge, the method 200 moves on to block 208, where the battery is controlled to deliver electrical power at the desired rate to the climate control system 80 to condition the battery 20 and/or the cabin air. More specifically, at block 208 the battery may deliver the power required to meet any electrical demand of the climate control system 80 including any electrical demand of the pump 88, the electric heater 90, the compressor 100, the fan 94, and/or the secondary fan 108 to condition the battery 20 and/or the cabin air.

Also, at block 208, the battery may be controlled to deliver electrical power at the desired rate to the climate control system 80 based on maintaining the actual battery state of charge at a value that is greater than or equal to the desired initial battery state of charge, which is based on a current battery charging value (e.g., the rate at which the charging station 78 is charging the battery) and a current battery discharging value (e.g., the rate at which one or more components of the vehicle, such as the climate control system 80 or other vehicle accessories 62, are discharging the battery). For example, if the difference between the current battery discharging value and the current battery charging value is not sufficient to decrease the battery state of charge to less than the desired initial battery state of charge, the battery will continue to deliver electrical power at the desired rate to the climate control system 80 to condition the battery 20 and/or the cabin air.

If it is determined at block 216 that the actual state of charge of the battery is not greater than or equal to (i.e., is less than) the desired initial battery state of charge, the method 200 moves on to block 218, where it is determined if the actual state of charge of the battery is less than a lower initial threshold. The lower initial threshold has a value that is less than the desired initial battery state of charge input at block 204. The difference between the lower initial threshold and the desired initial battery state of charge may be a preset offset value relative to the initial vehicle battery state of charge or may also be input into the controller via the HMI 96 or wireless device 98. Furthermore, the desired initial battery state of charge and the lower initial threshold may define a range of values. If the actual state of charge of the battery is not less than (i.e., is greater than or equal to) the lower initial threshold and within the range of values between the desired initial battery state of charge and the lower initial threshold, the method 200 moves onto block 212, where the battery is controlled to deliver electrical power at less than the desired rate to the climate control system 80 to condition the battery 20 and/or the cabin air. More specifically, at block 212 the battery may deliver power to the climate control system 80 at a rate that is less than the power required to meet the electrical demand of the climate control system 80 including the power demands of the pump 88, the electric heater 90, the compressor 100, the fan 94, and/or the secondary fan 108 to condition the battery 20 and/or the cabin air.

Also, at block 212, the battery may be controlled to deliver electrical power at less than the desired rate to the climate control system 80 to condition the battery 20 and/or the cabin air based on the actual battery state of charge decreasing to less than the desired initial battery state of charge, which is based on the current battery charging value (e.g., the rate at which the charging station 78 is charging the battery) and the current battery discharging value (e.g., the rate at which one or more components of the vehicle, such as the climate control system 80 or other vehicle accessories 62, are discharging the battery). For example, if the difference between the current battery discharging value and the current battery charging value is sufficient to decrease the battery state of charge to less than the desired initial battery state of charge, the battery will deliver electrical power at less than the desired rate to the climate control system 80 to condition the battery 20 and/or the cabin air.

If the actual state of charge of the battery is less than a lower initial threshold at block 218, the method moves onto block 214, where the battery is inhibited (i.e., prevented) from delivering electrical power to the climate control system 80 including the pump 88, the electric heater 90, the compressor 100, the fan 94, and/or the secondary fan 108 to condition the battery 20 and/or the cabin air.

The method 200 may move on to block 220 from block 208 where the electrical power being delivered from the battery to the climate control system 80 to condition the battery 20 and/or the cabin air may be adjusted. As a first example, if the battery is being controlled to deliver electrical power at the desired rate to the climate control system 80 according to block 208, after determining that the vehicle operator has not input a desired initial battery state of charge at block 204 and after determining that the actual state of charge of the battery is greater than or equal to the default threshold at block 206, the electrical power being delivered from the battery to the climate control system 80 to condition the battery 20 and/or the cabin air may be decreased at block 220 in response to the battery state of charge decreasing to less than the default threshold but greater than the lower default threshold or may be inhibited at block 220 in response to the battery state of charge decreasing to less than the lower default threshold.

As a second example, if the battery is being controlled to deliver electrical power at the desired rate to the climate control system 80 to condition the battery 20 and/or the cabin air according to block 208, after determining that the vehicle operator has input a desired initial battery state of charge at block 204 and after determining that the actual state of charge of the battery is greater than or equal to the desired initial battery state at of charge block 216, the electrical power being delivered from the battery to the climate control system 80 to condition the battery 20 and/or the cabin air may be decreased at block 220 in response to the battery state of charge decreasing to less than the desired initial battery state but greater than the lower initial threshold or may be inhibited at block 220 in response to the battery state of charge decreasing to less than the lower initial threshold.

The method 200 may also move on to block 220 from block 214 where the electrical power being delivered from the battery to the climate control system 80 to condition the battery 20 and/or the cabin air may be adjusted. Specifically, the electrical power being delivered from the battery to the climate control system 80 may be increased under such a scenario since the battery is being inhibited from delivering electrical power to the climate control system 80 at block 214. As a first example, if the battery is being inhibited from delivering electrical power to the climate control system 80 according to block 214, after determining that the vehicle operator has not input a desired initial battery state of charge at block 204, after determining that the actual state of charge of the battery is not greater than or equal to the default threshold at block 206, and after determining that the actual battery state of charge is less than the lower default threshold at block 210, the electrical power being delivered from the battery to the climate control system 80 to condition the battery 20 and/or the cabin air may be increased at block 220 to a value that is less than the desired value in response to the battery state of charge increasing to less than the default threshold but greater than the lower default threshold or may be increased to the desired value at block 220 in response to the battery state of charge increasing to greater than or equal to the default threshold.

As a second example, if the battery is being inhibited from delivering electrical power to the climate control system 80 to condition the battery 20 and/or the cabin air according to block 214, after determining that the vehicle operator has input a desired initial battery state of charge at block 204, after determining that the actual state of charge of the battery is not greater than or equal to the desired initial battery state of charge at block 216, and after determining that the actual battery state of charge is less than the lower initial threshold at block 218, the electrical power being delivered from the battery to the climate control system 80 to condition the battery 20 and/or the cabin air may be increased at block 220 to a value that is less than the desired value in response to the battery state of charge increasing to less than the desired initial battery state of charge but greater than the lower initial threshold or may be increased to the desired value at block 220 in response to the battery state of charge increasing to greater than or equal to the desired initial battery state of charge.

The method 200 may also move on to block 220 from block 212 where the electrical power being delivered from the battery to the climate control system 80 to condition the battery 20 and/or the cabin air may be adjusted. As a first example, if the battery is being controlled to deliver electrical power at less than the desired rate to the climate control system 80 to condition the battery 20 and/or the cabin air according to block 212, after determining that the vehicle operator has not input a desired initial battery state of charge at block 204, after determining that the actual state of charge of the battery is not greater than or equal to the default threshold at block 206, and after determining that the actual battery state of charge is not less than the lower default threshold at block 210, the electrical power being delivered from the battery to the climate control system 80 to condition the battery 20 and/or the cabin air may be increased or decreased at block 220 to a value that is less than the desired value in response to the battery state of charge increasing or decreasing respectively within the range between the default threshold and lower default threshold, may be increased to the desire value in response to the battery state of charge increasing to greater than or equal to the default threshold, or may be inhibited at block 220 in response to the battery state of charge decreasing to less than the lower default threshold.

As a second example, if the battery is being controlled to deliver electrical power at less than the desired rate to the climate control system 80 to condition the battery 20 and/or the cabin air according to block 212, after determining that the vehicle operator has input a desired initial battery state of charge at block 204, after determining that the actual state of charge of the battery is not greater than or equal to the desired initial battery state of charge at block 216, and after determining that the actual battery state of charge is not less than the lower initial threshold at block 218, the electrical power being delivered from the battery to the climate control system 80 may be increased or decreased at block 220 to a value that is less than the desired value in response to the battery state of charge increasing or decreasing respectively within the range between the desired initial battery state of charge and lower initial threshold, may be increased to the desire value in response to the battery state of charge increasing to greater than or equal to the desired initial battery state of charge, or may be inhibited at block 220 in response to the battery state of charge decreasing to less than the lower initial threshold.

It should be understood that the flowchart in FIG. 3 is for illustrative purposes only and that the method 200 should not be construed as limited to the flowchart in FIG. 3. Some of the steps of the method 200 may be rearranged while others may be omitted entirely. It should further be understood that the designations of first, second, third, fourth, etc. for any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a temperature control system;
   a battery configured to power the temperature control system;
   a human machine interface configured to receive a request to precondition cabin air or a temperature of the battery prior to initiating a drive cycle and to receive a desired initial battery state of charge prior to initiating the drive cycle; and
   a controller programmed to,
      in response to the request to precondition the cabin air or the temperature of the battery, an absence of receiving the desired initial battery state of charge, and an actual battery state of charge being greater than or equal to a default threshold, deliver electrical power from the battery to the temperature control system at a desired value to precondition the cabin air or the temperature of the battery,
      in response to the request to precondition the cabin air or the temperature of the battery, the absence of receiving the desired initial battery state of charge, and the actual battery state of charge being less than the default threshold, deliver electrical power from the battery to the temperature control system at less than the desired value to precondition the cabin air or the temperature of the battery,
      in response to the request to precondition the cabin air or the temperature of the battery, receiving the desired initial battery state of charge, and the actual battery state of charge being greater than or equal to the desired initial battery state of charge but less than the default threshold, deliver electrical power from the battery to the temperature control system at the desired value to precondition the cabin air or the temperature of the battery, and
      in response to the request to precondition the cabin air or the temperature of the battery, receiving the desired initial battery state of charge, and the actual battery state of charge being less than the desired initial battery state of charge, deliver electrical power from the battery to the temperature control system at less than the desired value to precondition the cabin air or the temperature of the battery.

2. The vehicle of claim 1, wherein the controller is further programmed to, in response to the request to precondition the cabin air or the temperature of the battery, the absence of receiving the desired initial battery state of charge, and the actual battery state of charge being less than a lower default threshold that is less than the default threshold, inhibit delivering electrical power from the battery to the temperature control system to precondition the cabin air or the temperature of the battery.

3. The vehicle of claim 2, wherein the controller is further programmed to, in response to the request to precondition the cabin air or the temperature of the battery, the absence of receiving the desired initial battery state of charge, and the actual battery state of charge decreasing within a range between the default threshold and the lower default threshold, decrease the electrical power being delivered from the battery to the temperature control system to precondition the cabin air or the temperature of the battery.

4. The vehicle of claim 2, wherein the controller is further programmed to, in response to the request to precondition the cabin air or the temperature of the battery, the absence of receiving the desired initial battery state of charge, and the actual battery state of charge increasing within a range between the default threshold and the lower default threshold, increase the electrical power being delivered from the battery to the temperature control system to precondition the cabin air or the temperature of the battery.

5. The vehicle of claim 1, wherein the controller is further programmed to, in response to the request to precondition the cabin air or the temperature of the battery, receiving the desired initial battery state of charge, and the actual battery state of charge being less than a lower initial threshold that is less than the desired initial battery state of charge, inhibit delivering electrical power from the battery to the temperature control system to precondition the cabin air or the temperature of the battery.

6. The vehicle of claim 5, wherein the controller is further programmed to, in response to the request to precondition the cabin air or the temperature of the battery, receiving the desired initial battery state of charge, and the actual battery state of charge decreasing within a range between the desired initial battery state of charge and the lower initial threshold, decrease the electrical power being delivered from the battery to the temperature control system to precondition the cabin air or the temperature of the battery.

7. The vehicle of claim 5, wherein the controller is further programmed to, in response to the request to precondition the cabin air, receiving the desired initial battery state of charge, and the actual battery state of charge increasing within a range between the desired initial battery state of charge and the lower initial threshold, increase the electrical power being delivered from the battery to the temperature control system to precondition the cabin air or the temperature of the battery.

8. The vehicle of claim 1, wherein the controller is programmed to,
   in response to the request to precondition the cabin air or the temperature of the battery, the absence of receiving the desired initial battery state of charge, and maintaining the actual battery state of charge to greater than or equal to the default threshold based on current battery charging and discharging values, deliver electrical power from the battery to the temperature control system at the desired value to precondition the cabin air or the temperature of the battery, and
   in response to the request to precondition the cabin air or the temperature of the battery, the absence of receiving the desired initial battery state of charge, and the actual battery state of charge decreasing to less than the default threshold based on the current battery charging and discharging values, deliver electrical power from the battery to the temperature control system at less than the desired value to precondition the cabin air or the temperature of the battery.

9. The vehicle of claim 1, wherein the controller is programmed to,
in response to the request to precondition the cabin air or the temperature of the battery, receiving the desired initial battery state of charge, and maintaining the actual battery state of charge to greater than or equal to the desired initial battery state of charge based on current battery charging and discharging values, deliver electrical power from the battery to the temperature control system at the desired value to precondition the cabin air or the temperature of the battery, and
in response to the request to precondition the cabin air or the temperature of the battery, receiving the desired initial battery state of charge, and the actual battery state of charge decreasing to less than the desired initial battery state of charge based on the current battery charging and discharging values, deliver electrical power from the battery to the temperature control system at less than the desired value to precondition the cabin air or the temperature of the battery.

10. A vehicle comprising:
a temperature control system;
an electric machine configured to propel the vehicle;
a battery configured to power the electric machine and the temperature control system; and
a controller programmed to,
in response to a request to precondition cabin air prior to initiating a drive cycle, an absence of receiving a signal indicative of a desired initial battery state of charge, and an actual battery state of charge being greater than a default threshold, deliver electrical power from the battery to the temperature control system at a desired value to precondition the cabin air,
in response to the request to precondition the cabin air prior to initiating the drive cycle, the absence of receiving the signal indicative of the desired initial battery state of charge, and the actual battery state of charge being less than the default threshold, deliver electrical power from the battery to the temperature control system at less than the desired value to precondition the cabin air,
in response to the request to precondition the cabin air prior to initiating the drive cycle, receiving the signal indicative of the desired initial battery state of charge, and the actual battery state of charge being greater than the desired initial battery state of charge but less than the default threshold, deliver electrical power from the battery to the temperature control system at the desired value to precondition the cabin air, and
in response to the request to precondition the cabin air prior to initiating the drive cycle, receiving the signal indicative the desired initial battery state of charge, and the actual battery state of charge being less than the desired initial battery state of charge, deliver electrical power from the battery to the temperature control system at less than the desired value to precondition the cabin air.

11. The vehicle of claim 10, wherein the controller is further programmed to, in response to the request to precondition the cabin air prior to initiating the drive cycle, the absence of receiving the signal indicative of the desired initial battery state of charge, and the actual battery state of charge being less than a lower default threshold that is less than the default threshold, inhibit delivering electrical power from the battery to the temperature control system to precondition the cabin air.

12. The vehicle of claim 11, wherein the controller is further programmed to, in response to the request to precondition the cabin air, the absence of receiving the signal indicative of the desired initial battery state of charge, and the actual battery state of charge decreasing within a range between the default threshold and the lower default threshold, decrease the electrical power being delivered from the battery to the temperature control system to precondition the cabin air.

13. The vehicle of claim 11, wherein the controller is further programmed to, in response to the request to precondition the cabin air prior to initiating the drive cycle, the absence of receiving the signal indicative of the desired initial battery state of charge, and the actual battery state of charge increasing within a range between the default threshold and the lower default threshold, increase the electrical power being delivered from the battery to the temperature control system to precondition the cabin air.

14. The vehicle of claim 10, wherein the controller is further programmed to, in response to the request to precondition the cabin air prior to initiating the drive cycle, receiving the signal indicative of the desired initial battery state of charge, and the actual battery state of charge being less than a lower initial threshold that is less than the desired initial battery state of charge, inhibit delivering electrical power from the battery to the temperature control system to precondition the cabin air.

15. The vehicle of claim 14, wherein the controller is further programmed to, in response to the request to precondition the cabin air prior to initiating the drive cycle, receiving the signal indicative of the desired initial battery state of charge, and the actual battery state of charge decreasing within a range between the desired initial battery state of charge and the lower initial threshold, decrease the electrical power being delivered from the battery to the temperature control system to precondition the cabin air.

16. The vehicle of claim 14, wherein the controller is further programmed to, in response to the request to precondition the cabin air prior to initiating the drive cycle, receiving the signal indicative of the desired initial battery state of charge, and the actual battery state of charge increasing within a range between the desired initial battery state of charge and the lower initial threshold, increase the electrical power being delivered from the battery to the temperature control system to precondition the cabin air.

17. The vehicle of claim 10, wherein the controller is programmed to,
in response to the request to precondition the cabin air, the absence of receiving the signal indicative of the desired initial battery state of charge, and maintaining the actual battery state of charge to greater than or equal to the default threshold based on current battery charging and discharging values, deliver electrical power from the battery to the temperature control system at the desired value to precondition the cabin air, and
in response to the request to precondition the cabin air, the absence of receiving the signal indicative of the desired initial battery state of charge, and the actual battery state of charge decreasing to less than the default threshold based on the current battery charging and discharging values, deliver electrical power from the battery to the temperature control system at less than the desired value to precondition the cabin air.

18. The vehicle of claim 10, wherein the controller is programmed to, in response to the request to precondition the cabin air, receiving the signal indicative of the desired initial battery state of charge, and maintaining the actual battery state of charge to greater than or equal to the desired initial battery state of charge based on current battery charging and discharging values, deliver electrical power from the battery to the temperature control system at the desired value to precondition the cabin air, and in response to the request to precondition the cabin air, receiving the signal indicative of the desired initial battery state of charge, and the actual battery state of charge decreasing to less than the desired initial battery state of charge based on the current battery charging and discharging values, deliver electrical power from the battery to the temperature control system at less than the desired value to precondition the cabin air.

19. A vehicle comprising:

a temperature control system;

a battery configured to power the temperature control system; and a controller programmed to, in response to a request to precondition a temperature of the battery prior to initiating a drive cycle, an absence of receiving a signal indicative of a desired initial battery state of charge, and an actual battery state of charge being greater than a default threshold, deliver electrical power from the battery to the temperature control system at a desired value to precondition the temperature of the battery, and in response to the request to precondition the cabin air prior to initiating the drive cycle, receiving the signal indicative of the desired initial battery state of charge, and the actual battery state of charge being greater than the desired initial battery state of charge but less than the default threshold, deliver electrical power from the battery to the temperature control system at the desired value to precondition the temperature of the battery.

20. The vehicle of claim 19, wherein the controller is programmed to, in response to the request to precondition the temperature of the battery prior to initiating the drive cycle, the absence of receiving the signal indicative of the desired initial battery state of charge, and the actual battery state of charge being less than the default threshold but greater than a lower default threshold, deliver electrical power from the battery to the temperature control system at less than the desired value to precondition the temperature of the battery, and in response to the request to precondition the temperature of the battery prior to initiating the drive cycle, receiving the signal indicative the desired initial battery state of charge, and the actual battery state of charge being less than the desired initial battery state of charge but greater than a lower initial threshold, deliver electrical power from the battery to the temperature control system at less than the desired value to precondition the temperature of the battery.

* * * * *